United States Patent [19]

Glezer et al.

[11] Patent Number: 5,040,560

[45] Date of Patent: Aug. 20, 1991

[54] METHOD AND APPARATUS FOR CONTROLLED MODIFICATION OF FLUID FLOW

[76] Inventors: Ari Glezer, 5945 N. Mina Vista, Tucson, Ariz. 85718; Kris J. Nygaard, 4815 W. Las Palmaritas, Glendale, Ariz. 85302; John M. Wiltse, 405 E. Prince Rd., Apt. 412, Tucson, Ariz. 85705

[21] Appl. No.: 622,716

[22] Filed: Dec. 5, 1990

[51] Int. Cl.⁵ ............................................. F15C 1/04
[52] U.S. Cl. .................................... 137/13; 137/828; 137/830; 137/831
[58] Field of Search .................. 137/13, 828, 82, 830, 137/831, 842

[56] References Cited

U.S. PATENT DOCUMENTS

| | | | |
|---|---|---|---|
| Re. 26,605 | 6/1969 | Cargill et al. | 137/828 |
| Re. 30,870 | 2/1982 | Inoue | 137/828 |
| 3,269,419 | 8/1966 | Dexter | 137/830 |
| 3,311,122 | 3/1967 | Gottron | 137/828 |
| 3,390,692 | 7/1968 | Hastie et al. | 137/828 |
| 3,604,441 | 9/1971 | Rockwell | 137/828 |
| 3,721,257 | 3/1973 | De Santis et al. | 137/828 |
| 4,170,244 | 10/1979 | Bernaerts | 137/83 |
| 4,257,224 | 3/1981 | Wygnanski et al. | 60/204 |
| 4,590,970 | 5/1986 | Mott | 137/828 |
| 4,635,849 | 1/1987 | Igashira et al. | 137/854 |

OTHER PUBLICATIONS

"Fluerics 28: State of Art 1969", Harry Diamond Laboratories Report HDL-TR-1478, Dec. 1969.
"Experimental and Theory of Acoustically Controlled Fluid Switches", Proceedings of the Fluid Amplification Symposium, vol. 2, Harry Diamond Labs, Oct. 1965.
Bulletin of the American Physical Society, New York, Series II, vol. 34, No. 10, Nov. 1989.

Primary Examiner—A. Michael Chambers
Attorney, Agent, or Firm—Cahill, Sutton & Thomas

[57] ABSTRACT

Substantial alteration of the flow conditions in a fluid stream are effected by the application of controlled disturbances to the boundary of or within the stream by one or more piezoelectric actuators. The actuators have resonance frequencies substantially in excess of the unstable frequencies of the stream. The actuators are energized by carrier signals at the resonance frequencies of the actuators, which carrier signals have been modulated at the desired unstable frequency of the stream.

12 Claims, 2 Drawing Sheets

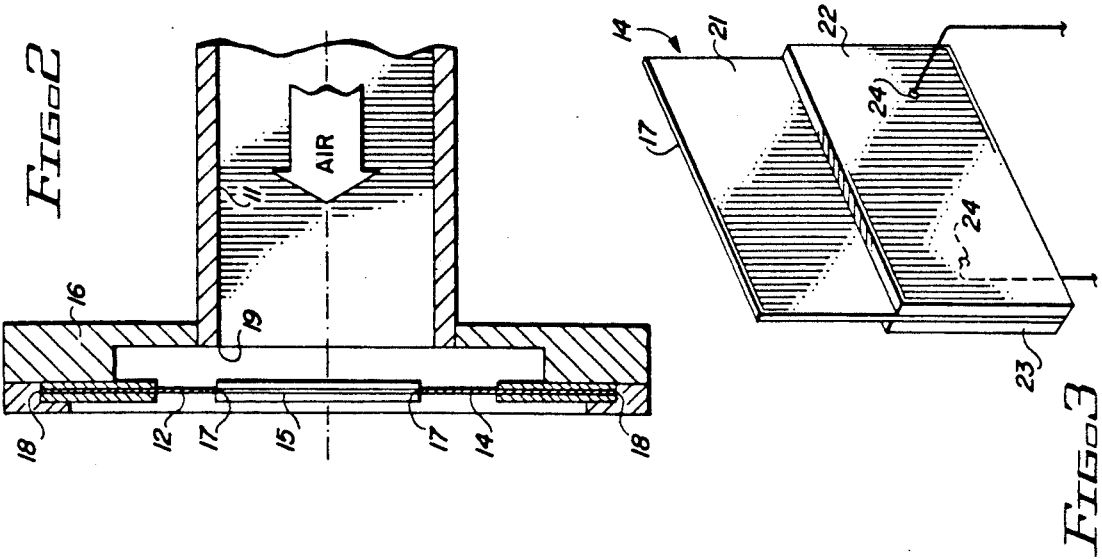
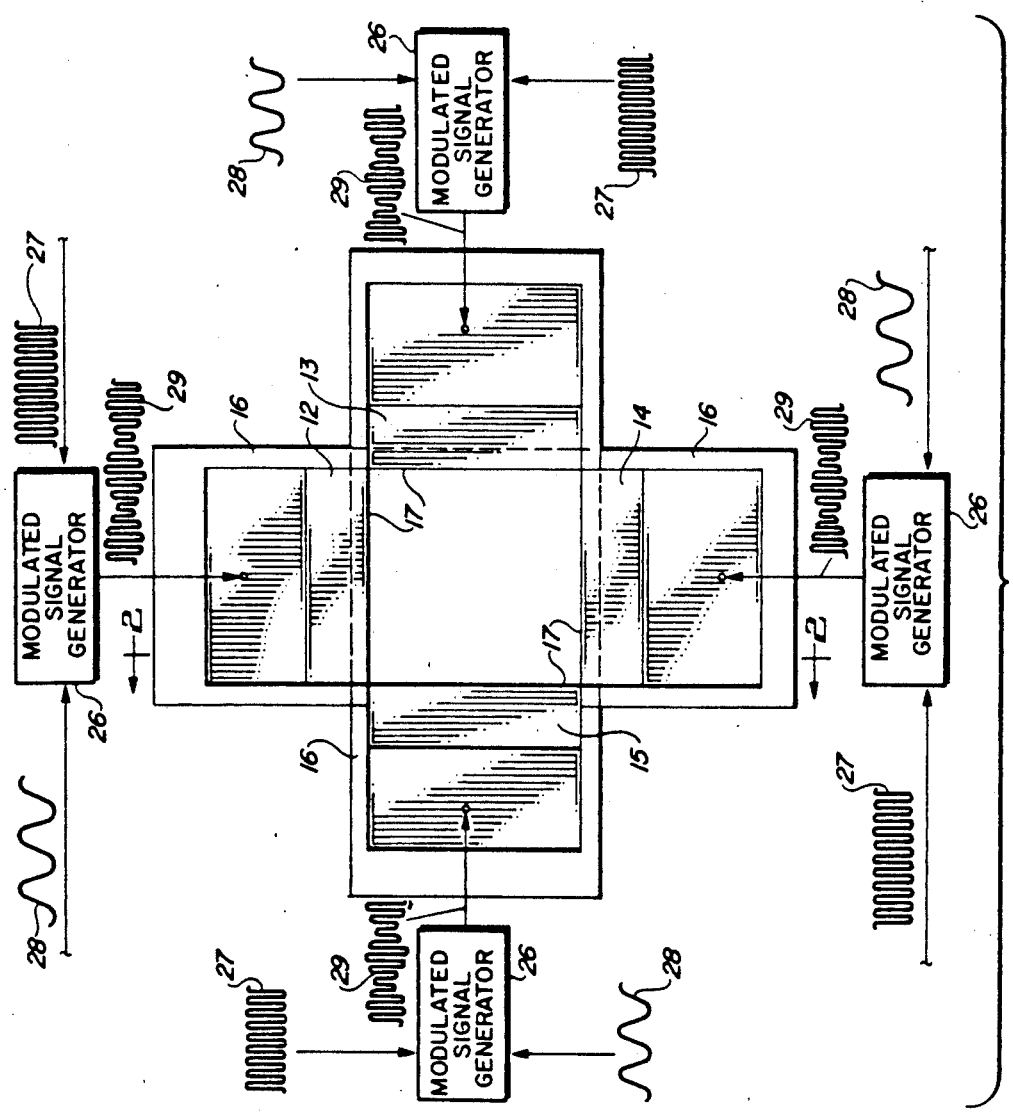

METHOD AND APPARATUS FOR CONTROLLED MODIFICATION OF FLUID FLOW

This invention is concerned with altering flow conditions of a fluid by the application of controlled disturbances, or perturbations, to the flow. The disturbances or perturbations may be applied at the boundary of a free flowing stream, at points of contact between the flow and a solid boundary, or within the flow stream. The invention is more particularly concerned with the utilization of piezoelectric actuators as flow manipulators.

BACKGROUND ART

It has been known for a number of years that substantial modification of free and wall-bounded flows can be effected by the introduction of small disturbances at the flow boundary. These flows are inherently unstable and hence amplify small disturbances within a finite frequency bandwidth which depends critically on the flow conditions, especially velocity. The most amplified frequency is the frequency to which the flow is most unstable. This is the frequency at which these small disturbances grow the fastest. Under most conditions this frequency increases with the flow velocity. It has also been known that the stability characteristics of a given flow can be determined from (and depend upon) the spatial distributions of its means velocity. Deliberate forcing or excitation of the flow instabilities can lead to substantial alteration of the structure and evolution of the forced flow. In the absence of deliberate excitation, the unforced flow typically responds to small disturbances, i.e. background noise, already present in a given apparatus.

Free shear flows such as jets, wakes, or shear layers are dominated by the evolution of large scale coherent vertical structures, or eddies, resulting from the inherent flow instabilities. Although the nominal formation frequency of these vertical structures corresponds to the most unstable frequency of the flow in question, their appearance and global features in the unforced flow are normally irregular in space and time because of the random nature of the disturbances which trigger them. When a free shear flow is deliberately forced, the temporal and spatial evolution of the large vertical structures is substantially modified to include synchronization of the formation and passage frequency of the vertical structures to the excitation frequency and marked changes in their spatial growth and other global features. For some given flow conditions these changes depend, among other things, on the frequency and magnitude of the excitation.

There are numerous applications for utilizing deliberate forcing in a flow system. For example, the mixing of two fluids can be enhanced by inducing small flow fluctuations in adjoining boundaries of the fluids at or just prior to the fluids coming into contact. U.S. Pat. No. 4,257,224, granted Mar. 24, 1981, to I. Wygnanski and H. Fiedler for "METHOD AND APPARATUS FOR CONTROLLING THE MIXING OF TWO FLUIDS" discloses a variety of mechanical and electromechanical actuators for producing the desired boundary flow fluctuations. The apparatus there disclosed is reputed to be useful in improving the performance of combustors, flame holders and afterburners in turbojet engines as well as suppressing audible jet noise and increasing the output of ejector pumps and thrust augmenters.

Laboratory experiments have demonstrated that the most amplified frequency can be forced acoustically with a conventional speaker which also allows for tuning of the forcing signal when the flow conditions, such as velocity, change. Among the obvious disadvantages of speakers are their physical dimensions, weight, and power requirements. If the desired forcing frequency is known exactly, a piezoelectric actuator can be used for acoustic forcing. Among the reasons for the attractiveness of these devices are: (a) they are inherently very thin and lend themselves to surface mounting with little intrusion to fluid flow; (b) they can be fabricated in slabs of practically any planar dimensions, particularly in small sizes; (c) they can be arrayed as mosaics for mounting on nonplanar surfaces; (d) when operated at their resonance frequency, piezoelectric devices require relatively little electrical power for a considerable acoustical output; (e) they are temperature and corrosion resistant; and (f) many are available off the shelf at low cost. The obvious limitation of piezoelectric devices is that they operate efficiently only within a narrow frequency band around their resonance frequency, and hence should be replaced if the flow velocity is increased or decreased because of corresponding changes in the most amplified frequency.

One application in which piezoelectric actuators have found considerable usefulness is in fluidic control systems. Fluidics technology focuses on devices which utilize fluids to perform control and sending functions within larger and more complex mechanical systems. The operation of fluidic devices is typically based on interaction between an incoming main fluid jet and a number of control jets within a solid cavity of a large aspect ratio. The purpose of the control jets is to regulate the inlet flow between two or more outlets. The control jets are normally smaller jets of the same fluid and the control function is accomplished by their direct impingement on the main jet. The cavity of the fluidic device is normally not filled with the main jet fluid and plays a crucial role in the control of the main jet by acting essentially as a tuned resonator. Fluidic devices are of considerable engineering interest because they operate with fewer moving parts than comparable mechanical devices.

Fluidic devices in which the main fluid jet is acoustically manipulated by speakers or piezoelectric transducers are discussed in a review article by J. J. Kirshner and R. Gottron, entitled "FLUERICS 28: State of the Art 1969", Harry Diamond Laboratories Report HDL-TR-1478, December 1969. This article makes clear that the endplates of the cavity have a critical effect on the controllability of the main jet. Furthermore, unlike free jets, i.e. those well removed from solid boundaries, the main jet in fluidic devices is effectively controlled by a wall attachment mechanism. The authors comment that "a laminar jet is much more sensitive to certain frequencies that (sic.) to others", and when the main jet is acoustically forced, its "eddy-shedding characteristics" are altered.

The principles of acoustical forcing of a fluidic device are discussed in detail in an article by H. H. Unfried entitled "Experiment and Theory of Acoustically Controlled Fluid Switches", Proceedings of the Fluid Amplification Symposium Vol. II, Harry Diamond Laboratories, October 1965. This article clearly states that the successful operation of acoustically-controlled switching fluidic devices depends on the controllability of the main jet by the solid boundary, i.e. by attachment and detachment, and that "the stream operation takes place in the region of the flow where it is most sensitive to small disturbances" specified in terms of the Reynolds number and the Strouhal number, which, for a given fluid and geometry are dimensionless velocity and frequency, respectively. The article by Unifried also states that the operation of the fluidic device is significantly enhanced by coupling an acoustic resonator, essentially a tuned cavity, or a separation bubble, to the main jet. This cavity increases the frequency selectivity of the jet and should be tuned to a frequency for which the flow is most sensitive.

Acoustical forcing of fluidic devices by speakers or piezoelectric devices is also described in several United States patents. In U.S. Pat. No. 3,269,419, granted Aug. 30, 1966, to E. M. Dexter for "FLUID AMPLIFIERS", a laminar main jet, also referred to as a power jet, becomes turbulent by the indirect action of a piezoelectric crystal disposed in a sidewall of the flow chamber closely adjacent the jet boundary layer. The "mechanical motion of the crystal face 18 causes condensations and rarefactions of the air in its immediate vicinity and thereby causes a physical disruption in the boundary layer of the laminar power jet. In turn, the power jet becomes turbulent and its boundary layer diverges". According to Dexter, it is the interaction between the main jet and the side wall which causes the deflection of the main jet due to increased entrainment. It is clear that the cavity of the fluidic device plays a major role in the controllability of the main jet.

In U.S. Pat. No. 3,311,122 granted March 28, 1969, to R. N. Gottron for "ELECTRO-FLUID TRANSDUCER", the main (power) jet is manipulated indirectly by applying pressure perturbations through a conducting medium. These pressure perturbations are generated using various acoustic drivers and transducers including piezoelectric crystals. This patent discloses several arrangements in which the piezoelectric crystals are disposed in different positions in relation to the main jet.

Further refinement of these ideas are disclosed in U.S. Pat. No. 3,390,692 granted July 2, 1968, to E. G. Hastie and R. N. Gottron for "PNEUMATIC SIGNAL GENERATOR". In this patent, the inventors distinguish between two control methodologies for fluidic devices: (a) "stream interaction or momentum exchanges", and (b) a scheme "based on boundary layer control or the Coanda effect". In the former scheme the main jet is deflected by the control jets with the cavity side wall well removed, while in the latter scheme the geometry of the side walls is critical to the operation of the fluidic device. It is clear that both control schemes considered in this patent are greatly influenced by the presence of the two cavity end plates. In principle the two control schemes are similar because in each case a resonating cavity is formed between the main jet and the side walls which is excited acoustically. Acoustic excitation can result in substantial increase or decrease in the rate of entrainment of surrounding fluid by the main jet. Due to an increase in entrainment the jet deflects back to its original trajectory. The attachment, detachment, and reattachment of the main jet to the side walls is referred by as the "Coanda effect". This fluidic device employs one or more piezoelectric crystals for generating acoustical signals to deflect the main jet. Because the removal of the acoustic forcing results in deflection of the jet towards its original trajectory, the inventors propose to control the switching of the fluidic device by amplitude modulation of the signal which drives the piezoelectric crystal.

As noted above, the effect of excitation on the jet flow depends strongly on the frequency and the level or amplitude of the excitation input. In particular, variations of the excitation level at a given forcing frequency may lead to substantial variations in the response of the forced flow. Acoustical cavity excitation along the main jet results in the jet's deflection. The level of excitation determines the degree of deflection. It is clear that the continuous variation of the excitation level results in a gradual deflection of the main jet, while on/off switching of the excitation signal causes a flip/flop motion of the main jet. The Hastie, et. al. patent suggests that the level of the acoustic excitation may be regulated via amplitude modulation. Gradual variation of the excitation amplitude and hence gradual deflection of the main jet within the cavity may be achieved by sinusoidal variation or modulation of the excitation amplitude at frequencies which are lower than the forcing frequency. Switching action can be achieved by amplitude modulation using a square wave as modulating signal.

The piezoelectric flow manipulating devices described in the Dexter, Gottron and Hastie, et. al. patents share a common limitation, namely, a lack of versatility. For harmonic excitation at a given amplitude the largest displacement of a piezoelectric actuator occurs within a narrow frequency bandwidth around its resonance frequency. Furthermore, this bandwidth decreases with increasing resonance frequency. The piezoelectric actuator can be excited by a signal over a somewhat broader frequency ranges but more power is required the farther away the signal frequency is from the resonance frequency. For all practical purposes, each piezoelectric crystal must be excited at its own natural resonance frequency for efficient operation.

In the Dexter, Gottron and Hastie, et. al. patents the maximum efficient deflection of the power jet is achieved when the jet is subjected via an adjacent cavity or bubble to an excitation signal having a frequency with respect to which the jet flow is most unstable. When the excitation signal is applied at this frequency the disturbance is actually amplified in the fluid flow. What this means is that for these prior art devices to function properly the natural resonance frequency of the piezoelectric crystal must match or be very close to the most unstable frequency of the jet/cavity system. And it is known that the most unstable frequency of a fluid system varies with flow conditions such as geometry and velocity. Thus, any changes in the velocity of the flow through these prior devices over time would require replacement of the piezoelectric crystal with another crystal having a different resonance frequency matching the most unstable frequency of the system. Hence, the patented devices will function properly only within a limited range of power jet velocity.

DISCLOSURE OF THE INVENTION

This invention is based on the discovery that it is possible to significantly modify a base fluid flow with a piezoelectric actuator having a resonance frequency which is significantly higher than the most unstable frequency of the flow. In the present invention the piezoelectric actuator is driven at its resonance frequency for maximum efficiency. Excitation of the flow is achieved by modulation of a carrier waveform, which is at the resonance frequency of the actuator, at a much lower desired forcing frequency to which the flow is unstable. The carrier waveform can be either amplitude- or frequency-modulated. The forcing waveform need not be time-harmonic or even time-periodic. It has been discovered that the base flow demodulates the actuator excitation waveform and is affected only by the modulating signal. Because the flow is not temporally receptive to excitation at the resonance frequency of the piezoelectric actuator, disturbances at this frequency are rapidly attenuated.

The invention further involves employing more than one piezoelectric actuator placed at different spatial domains of the base fluid flow for further enhancing its modification. These actuators may be configured in spatial mosaics having unmodulated carrier signals of different amplitudes to obtain spatial forcing by spatial modulation of the carrier signal amplitude. It has been discovered that resonantly driving the actuators with different amplitudes can provide a distorted mean flow having a featureless spectrum to which various low-frequency disturbances can be added by appropriate amplitude or frequency modulation and phase selection. It is well known that the stability characteristics of the base flow critically depend on the shape of its mean velocity distribution. Hence, this invention allows for alteration of the base flow by unmodulated carrier signals to achieve some desirable stability characteristics which can be further exploited using either amplitude or frequency modulation of the carrier waveforms.

The modification of the base flow based on this invention is not limited by, nor does it require a specific geometry of the flow apparatus. Furthermore, unlike the devices of the Dexter, Gottron, and Hastie, et. al. patents, excitation is effected by direct contact by the actuator with the flow.

BRIEF DESCRIPTION OF THE DRAWINGS

The invention is described in greater detail hereinafter by reference to the accompanying drawings, wherein:

FIG. 1 is a front elevational view of fluid flow control apparatus embodying this invention;

FIG. 2 is a vertical sectional view through the apparatus taken generally as indicated by line 2—2 in FIG. 1;

FIG. 3 is a perspective view of a piezoelectric actuator employed in practicing the invention.

BEST MODE FOR CARRYING OUT THE INVENTION

Figure 4:
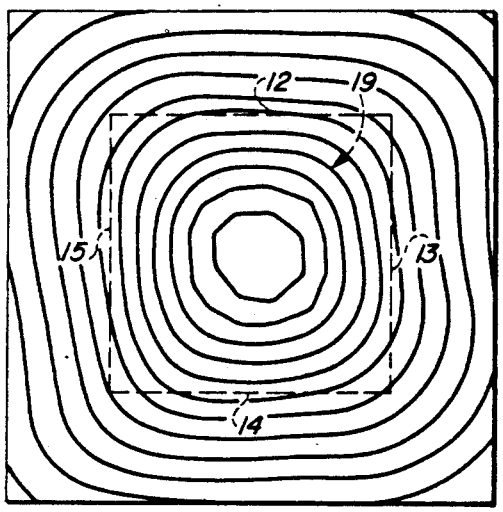
FIGS. 4 through 9 are velocity contour plots illustrating several ways in which a rectangular jet flow can be modified utilizing the apparatus of FIG. 1.

Modification of free of wall-bounded shear flows owes much of its importance to technological implementation in a number of applications which include:

Aircraft and underwater and ground vehicles for control of flow separation, improvement of stall characteristics of lifting surfaces, drag reduction, and improving inlet flow into engines.

Mixing applications with and without chemical reaction, (e.g., improved efficiency of internal combustion engines, chemical lasers, pharmaceutical and biomedical applications).

Propulsion applications (thrust vectoring, thrust reversing, minimization of infrared signatures of jet engines).

Noise reduction in jet engines.

Cooling of electronic circuits and components having complex geometrics.

Representative of these applications is modification of the flow characteristics of a jet stream issuing from a square nozzle.

Referring particularly to FIGS. 1 and 2, reference numeral 11 designates a square conduit, or nozzle, capable of projecting a rectangular jet of fluid, in this instance, air. Fluid flow direction is indicated by the large arrow in FIG. 2. The nozzle, used for experimental purposes and to demonstrate the usefulness of the invention, measures 1.5"×1.5". The jet velocity is 4 m/sec. It has been found that the jet is receptive to excitation frequencies between 4 and 40 Hz.

The fluid jet issuing from conduit 11 is modified, or forced, by four piezoelectric actuators 12, 13, 14, and 15. The four actuators 12, 13, 14, and 15 are carried in a support structure 16 mounted on the end of conduit 11. Each actuator is positioned such that its inner edge 17 just contacts a boundary region of the square fluid jet issuing from conduit 11. The outer ends 18 of the actuators are clamped in the support structure 16 a short distance downstream from the exit 19 of conduit 11. The arrangement is such that approximately 80% of each actuator is cantilevered about its clamped outer end 18. A representative one, 14, of the actuators 12, 13, 14, and 15 is illustrated in FIG. 3. As there shown, each actuator consists of a thin stainless steel blade 21 which is partially sandwiched along its width (which is equal to the width of the nozzle) between two rectangular plates 22 and 23 of piezoelectric ceramic material. Each piezoelectric plate is polarized along an axis parallel to its longest linear dimension. Conducting electrodes 24 are deposited on the major faces of each piezoelectric plate, and the plates are sandwiched so that they are polarized in opposite directions.

When an electric field is applied across the two outer electrodes of an actuator and normal to the axis of polarization, the actuator bends about its fixed end. The magnitude and direction of the displacement of the free end depends upon the magnitude and polarity of the applied voltage. The direction of displacement of the inner edge 17 reverses with a reversal of the polarity of the applied voltage. The largest displacement is achieved when the actuator is driven with a time-harmonic voltage at a resonance frequency $f_c$ which depends primarily on the resonance characteristics of the piezoelectric plates 22 and 23, their cantilevered lengths, the thickness and length of the stainless steel blade 21 and the rigidity of the actuator mounting.

A typical actuator 14 for use in the apparatus shown in FIGS. 1 and 2 may possess a resonance frequency $f_c = 500 \pm 20$ Hz. The actuator 14 will be capable of peak-to-peak displacement of its inner edges 17 of from 1.0 to 2.0 mm parallel to the axis of the jet stream issuing from conduit 11.

In accordance with this invention, the high frequency excitation signal at the resonance frequency of the piezoelectric actuator 14 is employed as a carrier and is modulated at a desired forcing frequency $f_m$ which is within the bandwidth of unstable frequencies for the jet flow. Modulation of either the amplitude or the frequency of the carrier signal can be employed.

Referring again to FIG. 1, there is diagrammatically illustrated a system for generating the modulated signals for the piezoelectric actuators 12, 13, 14, and 15. Each of the actuators has associated therewith a modulated signal generator 26. Each of these devices has supplied thereto a carrier signal 27 having a frequency corresponding to the resonance frequency of its piezoelectric actuator and a modulating signal 28 having a frequency corresponding to the desired forcing frequency $f_m$. For example, the forcing frequency may be 16 Hz while the resonance frequency of the piezoelectric oscillator is well above that, nominally 500 Hz. It should also be noted that in the present invention the modulating waveform does not need to be time-harmonic or time-periodic.

The response of each actuator 12, 13, 14, and 15 may take the form indicated at 29. As here illustrated, the carrier signal 27 has been amplitude-modulated by modulating signal 28. The excitation waveform may be described as $$e(t) = A[1 + \epsilon \sin(2\pi f_m t)]\sin(2\pi f_c t)$$

where
A is the amplitude of the carrier signal, $\epsilon$ is the degree of modulation ($\epsilon$ varies between 0 and 1), $f_c$ is the carrier frequency. The resonance frequency of the piezoelectric actuator can be selected to be well above the frequency bandwidth to which the flow in question is receptive. The modulating frequency is the desired excitation frequency to which the flow is receptive. Through nonlinear effects the excited flow demodulates the excitation waveform and is affected only by the modulating waveform while the carrier waveform is rapidly attenuated.

The effectiveness of piezoelectric actuators 12, 13, 14, and 15 in modifying the square jet emitted by conduit 11 is demonstrated in FIGS. 4 through 9. These figures graphically display streamwise velocity components of the square jet measured in a transverse plane downstream of the exit 19 of conduit 11 and downstream of actuators 12 through 15. The dotted lines denote the transverse extent of the square jet exit 19. Numerals 12, 13, 14, and 15 indicate, respectively, the positions of the piezoelectric actuators.

FIG. 4 shows the velocity contours of the jet stream when none of the actuators, 12, 13, 14, or 15 are energized. The velocity contours of the unforced jet show that at this downstream station the jet largely retains its initial squareness.

Figure 5:
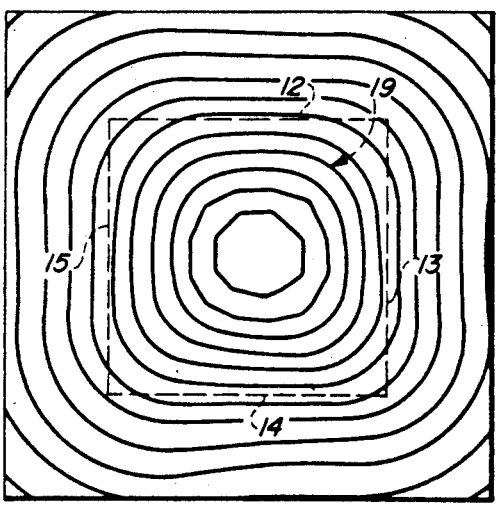

FIG. 5 shows velocity contours when all of the actuators are driven at their resonance frequencies by unmodulated carrier signals. The amplitude of the carrier waveforms is the same for all actuators. In this form of excitation the actuators are neither temporally nor spatially modulated and have virtually no effect on the structure of the jet which remains essentially square in configuration.

The remaining figures demonstrate the capability of the actuators 12, 13, 14, and 15 to substantially distort the jet flow when the actuators are supplied with various modulated signals.

Figure 6:
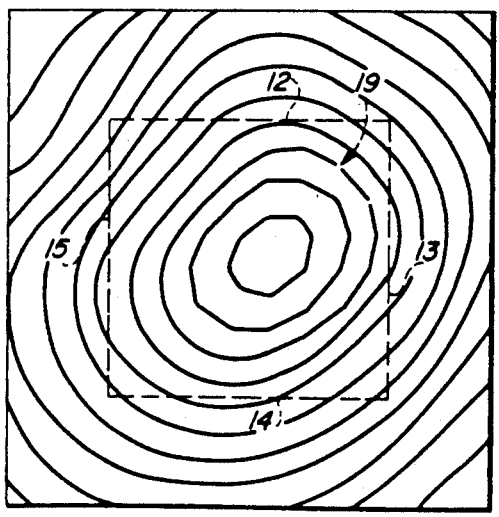

The condition illustrated in FIG. 6 has been created by driving actuators 12 and 13 with modulated signals which are 180° out of phase with modulated signals supplied to actuators 14 and 15. The resulting distorted flow is approximately symmetric about two planes passing through the jet's centerline and inclined approximately 45° to the horizon.

Figure 7:
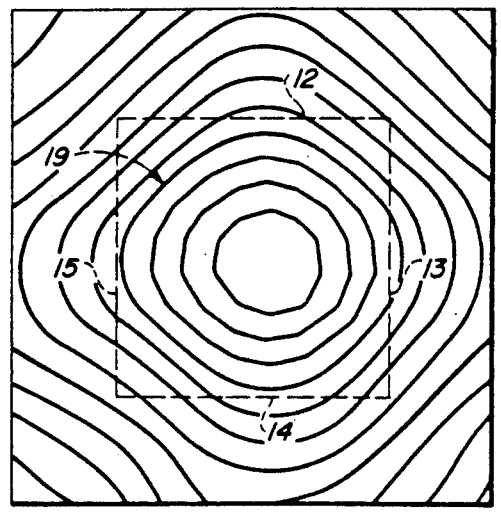

The condition illustrated in FIG. 7 has been created by driving actuators 12 and 14 180° out of phase with actuators 13 and 15. The jet flow has fourfold symmetry, equivalent to an approximate rotation of the original square jet.

Note that the phase relationships between the actuators for FIGS. 6 and 7 correspond (to lowest order) to azimuthal modes m=1 and 2 of an axisymmetric jet flow, respectively.

Figure 8:
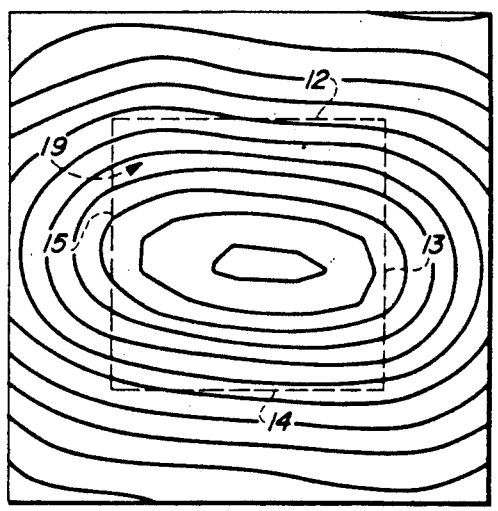

FIG. 8 illustrates the condition in which all actuators are driven at the resonance frequency with no modulation with the peak-to-peak amplitudes of actuators 13 and 15 being about 1.0 mm, and the peak-to-peak amplitudes of actuators 12 and 14 being about 2.0 mm. As a result of this spatial amplitude modulation of the carrier waveforms, the jet is highly distorted with an apparent aspect ratio slightly in excess of two.

FIG. 8, moreover, suggests that resonantly driving the actuators with different amplitudes but without modulation can provide a distorted mean flow having a featureless spectrum, to which various low frequency disturbances can be added by appropriate amplitude modulation and phase selection. Because the stability characteristics of the base flow depend on the shape of the distribution of its mean velocity, this capability further suggests the proper selection of unmodulated input waveforms can be used to tailor the mean velocity profile so as to provide favorable conditions for the introduction and propagation of desired low frequency disturbances.

Figure 9:
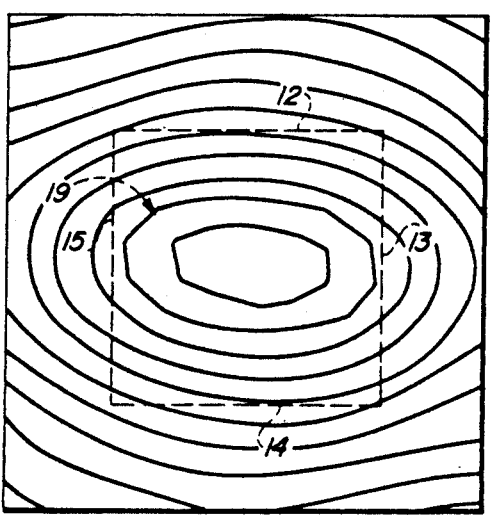

Finally, FIG. 9 demonstrates the effect of spatial and temporal modulation of signal to actuators 12, 13, 14, and 15. The mean flow is distorted by adjusting the amplitudes of the carrier signals to the actuators as in FIG. 8, and in addition modulating all four actuators 12, 13, 14, and 15 in phase at an unstable frequency of the jet. This causes the jet to attain an oval profile with the major axis aligned with the horizontal.

As mentioned previously, excitation of actuators 12, 13, 14, and 15 may also be effected by frequency modulation of the carrier signal. Such modulation in effect amplitude modulates the carrier signal due to the variation of the response of the actuators within the resonance bandwidth. The degree of modulation is approximately 1 when the excursion in the frequency of the carrier signal exceeds the resonance bandwidth.

It should be understood that the "out of phase" condition of the modulated signals supplied to two piezoelectric actuators can also be achieved by two modulating signals having different frequencies.

The utility of this invention has been demonstrated herein in a square air jet using a specific type of piezoelectric actuator. The fact that amplitude or frequency modulation can be used to manipulate this jet flow at different centerline velocities demonstrates that a given set of actuators (having a fixed resonance frequency) can excite other free or wall bounded shear flows by proper modulation of the carrier waveform. Thus, the excitation waveform is tailored to the flow, providing a much more flexible approach than matching the resonance frequency of the actuators to the receptivity of the flow as was done in the prior art.

What is claimed is:

1. A method for altering the characteristics of a fluid stream flow having unstable flow frequencies, the method comprising the application of controlled disturbances to the flow with a piezoelectric actuator having supplied thereto a carrier signal having a frequency substantially equivalent to the resonance frequency of the actuator and substantially higher than the unstable frequencies of the flow while modulating said carrier signal at a frequency to which the flow is unstable.

2. The method of claim 1, further involving applying an additional control disturbance to another region of the flow with at least one other piezoelectric actuator.

3. The method of claim 2, including supplying two of said piezoelectric actuators with like modulated carrier signals and carrier signals having the same amplitude.

4. The method of claim 2, including supplying one of said piezoelectric actuators with a modulated carrier signal which is out of phase with the modulated carrier signal supplied to a second piezoelectric actuator and the carrier signals supplied to both actuators have the same amplitude.

5. The method of claim 2, including supplying two of said piezoelectric actuators with like modulated carrier signals and carrier signals having different amplitudes.

6. The method of claim 2, including supplying one of said piezoelectric actuators with a modulated carrier signal which is out of phase with the modulated carrier signal supplied to said second piezoelectric actuator and the carrier signals supplied to the two actuators have different amplitudes.

7. A method for altering the characteristics of a fluid stream flow, the method comprising the application of controlled disturbances to the flow with at least two piezoelectric actuators having supplied thereto carrier signals having frequencies substantially equivalent to the resonance frequencies of the actuators, the carrier signal supplied to one of said actuators having an amplitude that is different from the amplitude of the carrier signal supplied to another actuator.

8. Apparatus for altering the flow characteristics of a fluid stream having unstable frequencies, said apparatus comprising a piezoelectric actuator having a resonance frequency substantially in excess of the unstable frequencies of said stream, said actuator having a portion thereof in contact with the fluid of said stream, said actuator when energized providing controlled disturbances within the stream, and a modulated signal generator for energizing said actuator, said generator supplying to the actuator a carrier signal at the resonance frequency of the actuator which carrier signal has been modulated at an unstable frequency of the stream.

9. The apparatus of claim 8, further comprising a second piezoelectric actuator having a portion thereof in contact with the fluid at another region of the stream, and a second modulated signal generator for energizing said second actuator.

10. The apparatus of claim 8 further characterized in that said signal generator and said second signal generator supply like signals, respectively, to said piezoelectric actuator and said second piezoelectric actuator.

11. The apparatus of claim 8, further characterized in that the signal supplied to said piezoelectric actuator by said signal generator is out of phase with the signal supplied to said second piezoelectric actuator by said second signal generator.

12. Apparatus for altering the flow characteristics of a fluid stream, said apparatus comprising first and second piezoelectric actuators having a portion of each actuator in contact with the fluid in said stream, and signal generating means for energizing said actuators, said signal generating means supplying signals to said actuators at the resonance frequency of the actuators, the signal supplied to one of said actuators having a greater amplitude than the signal supplied to the other actuator.

* * * * *